United States Patent
Aymonier et al.

(10) Patent No.: US 10,507,597 B2
(45) Date of Patent: Dec. 17, 2019

(54) METHOD AND DEVICE FOR DISMANTLING MULTILAYER SYSTEMS INCLUDING AT LEAST ONE ORGANIC COMPONENT

(71) Applicant: Centre national de la recherche scientifique, Paris (FR)

(72) Inventors: Cyril Aymonier, Pessac (FR); Cédric Slostowski, Pessac (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 15/756,398

(22) PCT Filed: Sep. 2, 2016

(86) PCT No.: PCT/EP2016/070767
§ 371 (c)(1),
(2) Date: Feb. 28, 2018

(87) PCT Pub. No.: WO2017/037260
PCT Pub. Date: Mar. 9, 2017

(65) Prior Publication Data
US 2018/0257267 A1    Sep. 13, 2018

(30) Foreign Application Priority Data

Sep. 3, 2015  (FR) ...................... 15 58185

(51) Int. Cl.
B32B 43/00    (2006.01)
B29B 17/02    (2006.01)
(Continued)

(52) U.S. Cl.
CPC ............ B29B 17/02 (2013.01); B32B 43/006 (2013.01); C08J 11/06 (2013.01);
(Continued)

(58) Field of Classification Search
CPC . B32B 38/10; B32B 43/006; Y10T 156/1142; Y10T 156/1147;
(Continued)

(56) References Cited

U.S. PATENT DOCUMENTS 6,306,564 B1 * 10/2001 Mullee .................... G03F 7/422
                                                                134/1.3
7,909,959 B2 * 3/2011 Tada .......................... C09J 5/00
                                                                 156/706
(Continued)

FOREIGN PATENT DOCUMENTS

| JP | H0892411 | 4/1996 |
| WO | WO-9703802 | 2/1997 |

OTHER PUBLICATIONS

International Search Report for PCT/EP2016/070767, dated Sep. 22, 2016.
(Continued)

*Primary Examiner* — Mark A Osele
*Assistant Examiner* — Nickolas R Harm
(74) *Attorney, Agent, or Firm* — B. Aaron Schulman, Esq.; Stites & Harbison, PLLC

(57) ABSTRACT

Method and device for delamination/dismantling of multilayer systems SM comprising several layers including at least one organic layer, wherein the layers are separated by interfaces, characterized in that it comprises at least the following steps:

Figure 1:
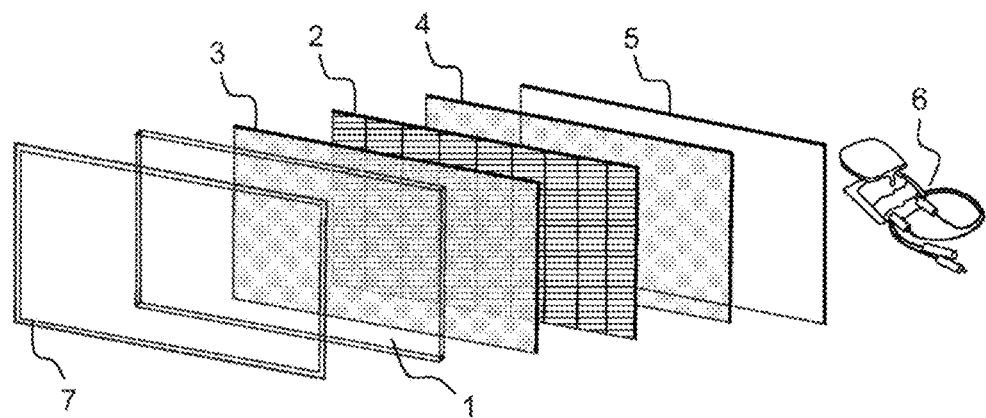

Mixing the multilayer system with a fluid composed of at least one gas having the particularity of causing the swelling of at least one of the layers and one or more non-reactive liquids having the particularity of allowing the separation of each layer unitarily or of subsets of layers composing the multilayer system without degradation of the constituents of the layers, the gas/liquid fluid being raised in temperature and pressure,
(Continued)

Recovering separately at least one or more layers or a subset of undegraded layers.

8 Claims, 5 Drawing Sheets

(51) Int. Cl.
    *C08J 11/06*     (2006.01)
    *B29L 7/00*     (2006.01)
    *B29L 9/00*     (2006.01)
    *B32B 38/10*     (2006.01)
    *B29L 31/00*     (2006.01)
    *B29L 31/34*     (2006.01)

(52) U.S. Cl.
    CPC . *B29B 2017/0293* (2013.01); *B29L 2007/008* (2013.01); *B29L 2009/008* (2013.01); *B29L 2031/34* (2013.01); *B29L 2031/7166* (2013.01); *B32B 38/10* (2013.01); *B32B 2305/70* (2013.01); *B32B 2315/08* (2013.01); *B32B 2323/00* (2013.01); *B32B 2327/12* (2013.01); *B32B 2367/00* (2013.01); *B32B 2457/12* (2013.01); *Y02W 30/622* (2015.05); *Y02W 30/701* (2015.05); *Y10T 156/1142* (2015.01); *Y10T 156/1147* (2015.01); *Y10T 156/1153* (2015.01); *Y10T 156/1911* (2015.01); *Y10T 156/1928* (2015.01)

(58) Field of Classification Search
    CPC ......... Y10T 156/1153; Y10T 156/1811; Y10T 156/1928
    USPC ......................... 156/709, 710, 711, 752, 755
    See application file for complete search history.

(56) References Cited

U.S. PATENT DOCUMENTS

| | | | |
|---|---|---|---|
| 2002/0081250 A1* | 6/2002 | Lord | ........................ B01J 8/003 422/198 |
| 2010/0086788 A1* | 4/2010 | Tsuji | ................... B29C 47/0038 428/437 |
| 2016/0214368 A1 | 7/2016 | Kernbaum et al. | |

OTHER PUBLICATIONS

Written Opinion of the International Searching Authority for PCT/EP2016/070767, dated Sep. 22, 2016.
Preliminary Search Report for FR 1558185, dated Jan. 21, 2016.

\* cited by examiner

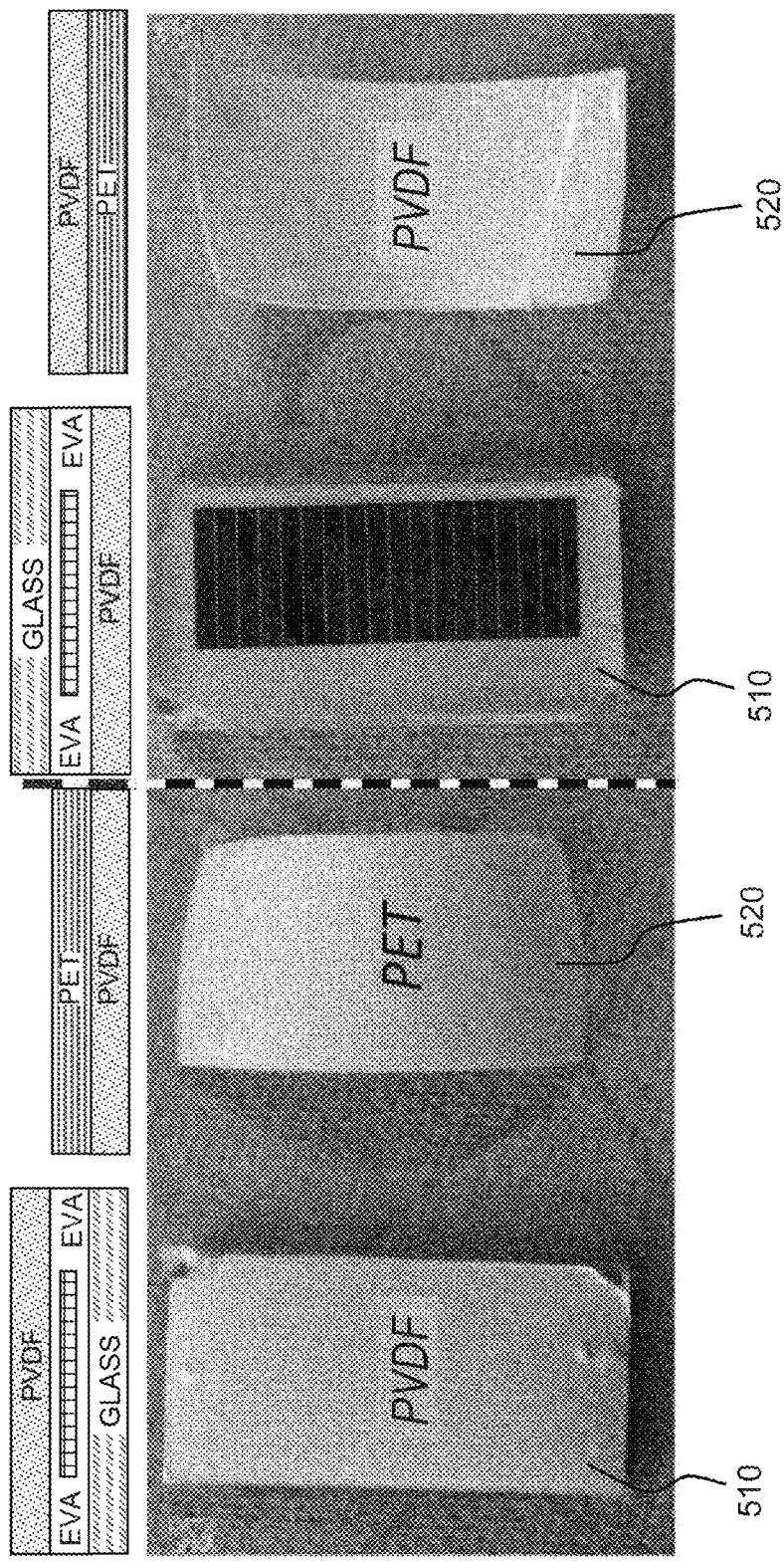

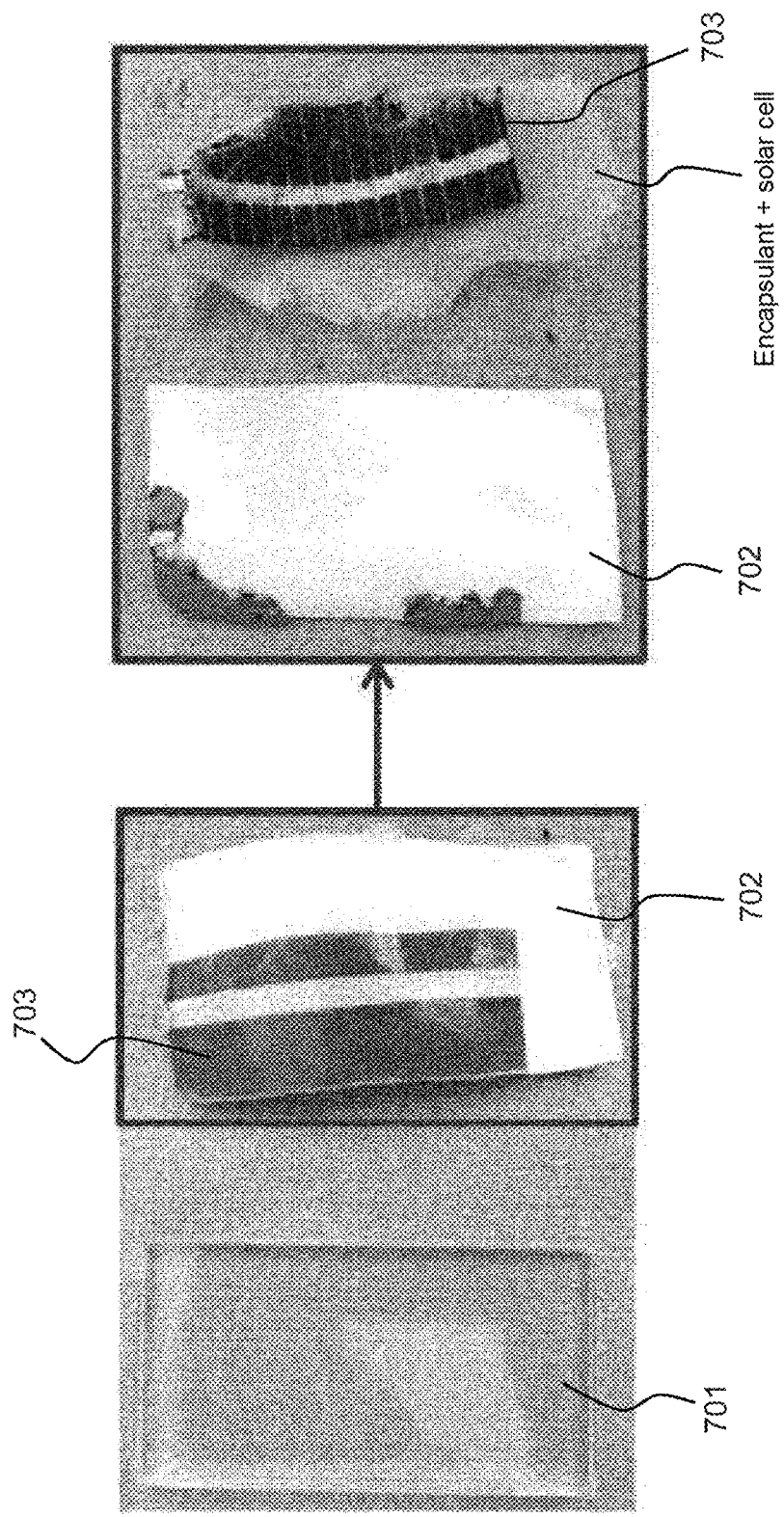

METHOD AND DEVICE FOR DISMANTLING MULTILAYER SYSTEMS INCLUDING AT LEAST ONE ORGANIC COMPONENT

The invention relates to a method and a device for dismantling a multilayer system. The invention particularly relates to a method for recycling multilayer products comprising at least one layer of organic material.

Multilayer systems or products are involved in our daily lives in a wide variety of applications. For example, they are found in:
- food packaging, such as cartons containing drinks, coffee capsules or packaging, yoghurt pots, etc.
- pharmaceutical packaging involving a plastic-aluminum assembly,
- electronics, in particular all computer screens, smartphones, televisions involving an assembly of glass and organic, often with inorganic and metallic layers,
- organic electronics (display system, screens, OLEDs (organic light-emitting diodes), organic photovoltaic modules that consist of a stack of layers of organic materials of various kinds and designs),
- solar panels involving assemblies of glass, polymers, etc.

These multilayer systems generate a lot of waste whose disposal is problematic. In fact, this waste often includes recoverable materials. However, the separation of the different layers of the system is necessary in order to separately recover or recycle each of the components. One of the most telling examples concerns technological waste. Disposal of this electronic component waste poses various problems, among which are:
- pollution due to electronic or organic components that may contain toxic elements, for example cadmium Cd in solar panels, or lead in batteries,
- the loss of components whose sources may be limited, such as rare earth elements, or whose recovery could generate economic gain, such as noble metals,
- the taking up of the space due to the presence of this waste.

When seeking to recover each of the components of a multilayer system, it is necessary to perform a step of disassembly or separation of the different layers of the waste, so that each of these layers may undergo appropriate treatment.

In the case of photovoltaic panels with crystalline silicon technology, attempts are made to separate the various layers, i.e. the glass layer, the organic layer(s) (polymers), the crystalline silicon and various metals. The separation of the various layers remains a problem due to the presence of a fluorinated polymeric layer, the rear surface, which requires to take certain precautions during recycling. In fact, the thermal decomposition of the fluorinated polymer generates other fluorinated compounds which are dangerous and toxic. The presence of fluoropolymers therefore limits the recycling processes since there is a risk of formation of these fluorinated derivatives, and this is why attempts are made to separate them before any other recycling step. Thus, the separation of this layer is a priority in order to consider viable recycling techniques. However, when subjected to relatively low temperatures, between 150° C. and 200° C., this fluoropolymer degrades to form dangerous fluorinated compounds. Thus, the use of thermal processes for the removal of this layer does not make it possible to recover the material as a raw material and also requires the implementation of strict procedures for the safety and recycling of gaseous effluents.

One way to proceed is to grind the multilayer system, which allows, for example in the case of a photovoltaic module, the recovery of only a fraction of the glass. The recovered glass requires additional treatment in order to be reused. The recycling of the crystalline silicon or PV c-Si photovoltaic modules generally stops after the grinding/separation step and only allows the recovery of some metals as well as impure glass in the form of ground material that is of an inferior quality compared to the original quality of the material. Many impurities in this ground glass do not allow reuse as solar glass unless, for example, a dry purification process is implemented. To do this, it is possible to carry out a step of purifying the surface of the glass by abrasion in order to eliminate the pollutant, and obtain a glass with sufficient purity for resale (flat glass, quality inferior to the original quality of the material). The non-recovery of solar cells is problematic. The purification of solar cell debris as well as the recovery of other metals requires additional chemical treatment steps. The mechanical processes are simple enough to implement, but remain insufficient to recover all the valuable materials of the module with a sufficient degree of purity.

It is also possible to incinerate the photovoltaic module at high temperature in order to eliminate the different organic layers. However, this technique requires significant amounts of energy to reach the required temperatures ranging from 450° C. to 600° C. and significant safety measures to manage the production of fluorinated compounds. In addition, the glass may be broken due to heat stress during the treatment. The different compounds recovered after this treatment, glass, solar cells (c-Si and metal connections) and metals may be polluted by organic residues and thus require one or more additional treatment steps. Thermal processes are generally excessively energy intensive and expensive. In addition, the recovery of pure materials requires coupling with a mechanical or chemical process due to incineration residues.

Another approach is to use chemical etching of different organic layers to recover glass, solar cells and metals. This technique has many disadvantages. In fact, the chemical etching is carried out in several stages generally involving toxic solvents that are dangerous for the environment, toluene, for example, as well as acids such as sulfuric acid for example. These solvents and acids are expensive and their use leads to the generation of new waste because of their pollution by organic residues. In addition, they may also attack/pollute solar cells and glass, thus degrading the purity of the recovered materials. The chemical treatments have the disadvantage of requiring the use of large quantities of chemicals, such as acids or solvents, which may be problematic from the point of view of method (safety, recycling of solvents . . . ), economy (product prices, regular regeneration . . . ) and environment (creation of possible additional waste).

Most of the recycling methods implemented, therefore, involve high costs and do not make it possible to optimize the recovery of each of the layers constituting a component or a multilayer system comprising at least one organic layer.

The patent application WO 2012101189 proposes a method of recycling photovoltaic modules that consists in separating multi-materials into base materials. The technology is based on the separation of composite materials using microemulsions based on surfactants. The principle of the method is to reduce the interfacial tensions between each component in order to separate them. Several steps are necessary in this separation process:

an optional grinding step, which involves reducing the size of the materials in order to create as much contact area as possible for the microemulsion, but also to simplify the handling of the material in the course of the method, a microemulsion, wherein the pre-ground composite materials are treated in the microemulsion. The separation or delamination is effected by stirring at low temperature. In the end, the individual fractions or products appear in the microemulsion, a washing step wherein, during this step, the products are filtered and the microemulsion is reconditioned. The products are then washed with a cleaning water which will also be reconditioned, a sorting step wherein the washed products are sorted using a conventional procedure such as densitometric separation, sieving, etc., and obtained individually, an optional drying step in which the products may be dried, if necessary.

This method has many economic advantages because it allows a high rate of recycling and recovery of materials with no loss at low energy and financial cost (ambient temperature, water use, . . . ) and allows the recovery of high purity materials (no phase change during treatment). It is also of environmental interest because of the microemulsions but also because the washing water is reusable. Nevertheless, this process involves many steps, while microemulsions use large amounts of water to reduce the proportion of surfactants used.

There is therefore a need for a method for separation in a viable, reliable and safe manner, of the various layers of a multilayer system in order to individually recover them while avoiding their degradation. The clean and clear separation of the various layers of a system comprising several layers including at least one organic layer, remains a key stage to be considered for the optimization of recycling and recovery processes. Thus, the fact of being able to recover the original glass in the case of photovoltaic modules has a much higher economic interest than the recovery of a polluted glass that can only be reused for insulation applications, for example.

A multilayer system according to the invention is a composite material consisting of a stack of inorganic and/or organic layers including at least one organic layer. The bond between two successive layers in the system may be provided by a layer of glue but the interface may also be of a chemical nature, for example one that is obtained by activating a glass surface so that it reacts with an organic layer when assembling the multilayer system. During the method, it will be possible, through the choice of the temperature treatment parameters, pressure and also the choice of fluids, to choose to separate either each layer unitarily or subsets of layers as needed. A layer may itself be composed of several components.

The method according to the invention is based on a new approach to separating at least the various layers or subsets of layers of a multilayer system by using a fluid composed of a gas and a mixture of non-reactive liquids in the ambient conditions of temperature and pressure (25° C. and 0.1 MPa) and to raising it in temperature and pressure, and particularly in a supercritical environment. The term "liquid mixture" will be used to designate a liquid or several non-reactive liquids mixed in variable proportions, wherein the liquids have, in particular, the function of separating the layers without affecting the components.

The invention relates to a method of delamination/dismantling multilayer systems SM comprising several layers including at least one organic layer, the layers being separated by interfaces, characterized in that it comprises at least the following steps:

mixing the multilayer system with a fluid composed of at least one gas having the particularity of causing the swelling of at least one of the layers and one or more non-reactive liquids having the particularity of allowing the separation of each layer unitarily or of subsets of layers composing the multilayer system without degradation of the constituents of the layers, the gas/liquid fluid being raised in temperature and pressure, recovering separately at least one or more layers or a subset of undegraded layers.

According to an alternative embodiment, the treatment temperature $T_r$ is chosen to be greater than the critical temperature $T_c$ of the gas and lower than the degradation temperature $T_g$ of the layers of the multilayer system, the treatment pressure $P_r$ is chosen to be greater than the critical pressure $P_c$ of the gas and the volume proportion of liquid mixture relative to the gas is at least 15%.

It is possible to implement the method with a temperature between 30° C. and 150° C. and a pressure between 5 MPa and 50 MPa.

The fluid used is, for example, a $CO_2$/water/acetone mixture with a proportion of water relative to acetone ranging from 0 to 100%.

The treatment temperature may be between 60° C. and 130° C.

The method may be used for the treatment of multilayer systems, for example, a photovoltaic module comprising a fluorinated layer, a packaging, a food packaging, a cosmetic or pharmaceutical packaging, an organic electronic component.

The method may include a step of precutting the multilayer systems and a step of rinsing and drying the layers or subsets of separate layers.

The invention also relates to a device for delamination/dismantling of multi-layer systems comprising several layers including at least one organic layer, the layers being separated by interfaces, characterized in that it comprises at least the following elements in combination:

a reactor comprising at least:
  a first inlet for the introduction of at least the multilayer SM system to be treated, a second inlet for the introduction of a fluid composed of at least one gas having the characteristic of causing the detachment of the layers, and at least one inlet for the liquid or a mixture of liquids,
  a first outlet for recovering the gas at the end of the method,
  a device for raising the temperature (heating) of the reactor in order to raise the temperature of the gas fluid/non-reactive liquid mixture.

According to an alternative embodiment, the device may comprise a gas reservoir connected to a cooling device via a first conduit, a high pressure pump whose outlet is connected to a preheater, which itself is connected with a first valve of a gas introduction conduit connected to the first inlet, and a conduit for evacuating gas to an enclosure.

The device may also comprise one or more liquid introduction lines connected to a second inlet of the reactor, a line comprising at least a second conduit equipped with a third control valve, a pump which receives the mixture of liquids stored in a reservoir, a drain circuit connected to a second outlet of the reactor connected to a conduit equipped with a third valve and a reservoir or a drain pipe.

Figure 2:
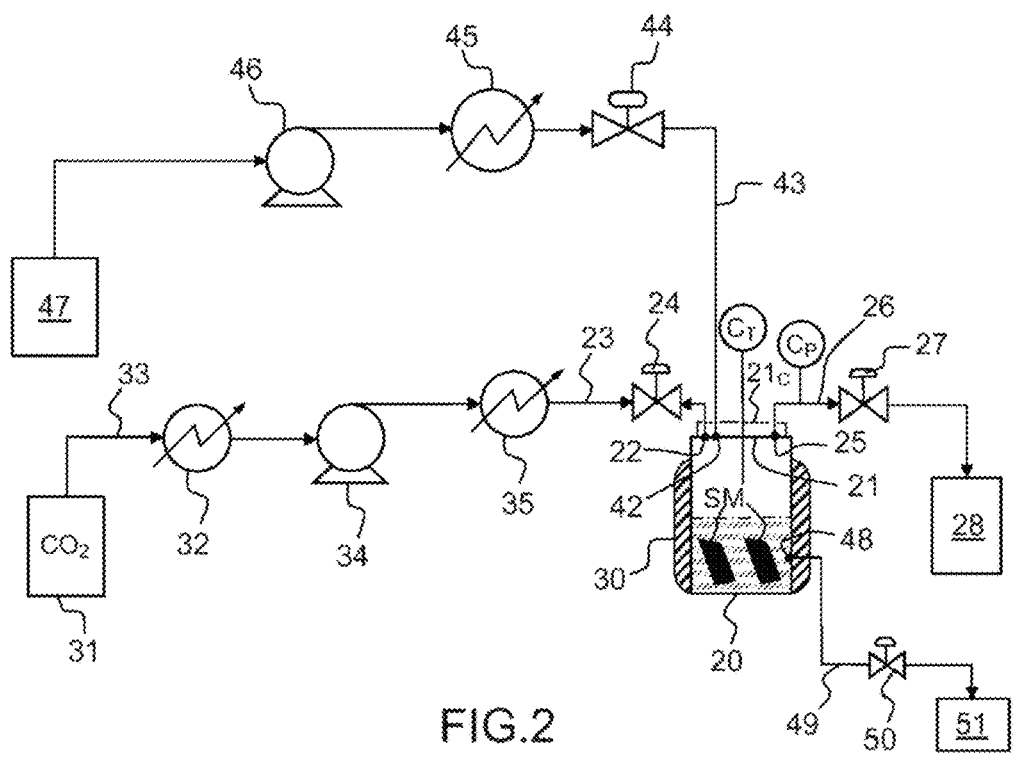
Figure 3A:
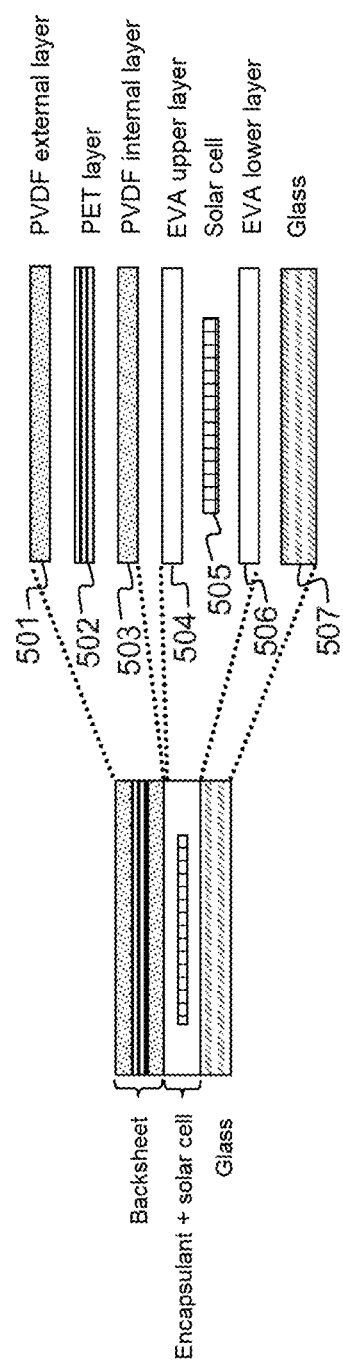
Figure 4B:
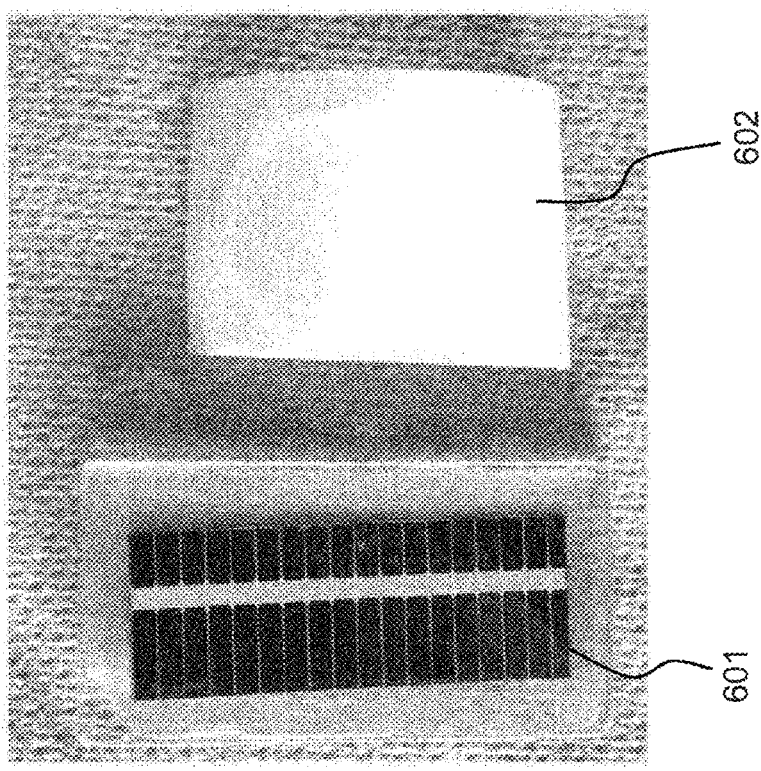
Figure 4A:
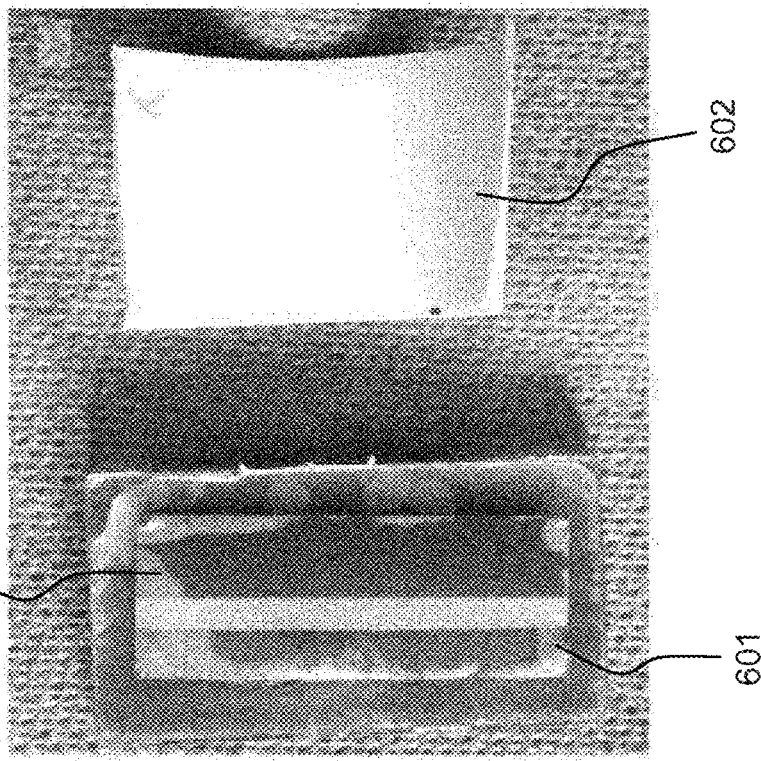

Other characteristics and advantages of the present invention will become clearer upon reading the description of exemplary embodiments given in the appended figures by way of illustration and in no way limiting, wherein:

FIG. 1 shows a structure of a photovoltaic module,

FIG. 2 shows an exemplary device for implementing the method according to the invention, FIG. 3a shows a representation of a photovoltaic module, while FIGS. 3b and 3c show the result of the mechanical separation of the layers of the rear surface (backsheet) of a photovoltaic module, by the $CO_2$/acetone fluid, FIGS. 4a and 4b, show the result of the mechanical separation of the backsheet of a photovoltaic module, by a $CO_2$/water/acetone fluid, FIGS. 5a and 5b show the result of the mechanical separation of the layers of the backsheet of a photovoltaic module, by a $CO_2$/water/acetone fluid.

In order to clearly understand the steps and operation of the method according to the invention, the following example is given in the context of dismantling a photovoltaic module. There are a number of photovoltaic module technologies. Photovoltaic modules based on crystalline silicon dominate the photovoltaic module market. These photovoltaic modules with c-Si technology are multilayer systems whose recycling and recovery require the separation of the different layers in order to extract the materials of interest.

An example of a photovoltaic module with crystalline silicon technology shown in FIG. 1 is a multilayer assembly simultaneously comprising organic components, encapsulant and backsheet and inorganic polymers, glass, crystalline silicon and metals (Ag, Cu, Al). The conventional composition of these modules is as follows:

- a solar glass front panel, 1, better known as the frontsheet,
- a set of several c-Si solar cells and metals to ensure electrical junctions (Ag, Cu, Sn, . . . ), 2, all of which is encapsulated between two layers of ethylene-vinyl acetate (EVA encapsulant), 3 and 4,
- a backsheet 5, which may be made of glass but which mainly comprises an assembly of polymer layers comprising at least one fluoropolymer layer (PVF polyvinyl fluoride or PVDF polyvinylidene fluoride),
- a junction box 6 for making the electrical connection between the domestic network and the photovoltaic module PV,
- an aluminum frame 7 surrounding the photovoltaic module PV.

The presence of fluoropolymers in the backsheet today represents a technological block to the recycling of the various layers. In fact, the thermal decomposition of fluorinated polymers, such as PVF or PVDF, results in the generation of toxic and dangerous fluorinated compounds for the operator, the environment and the method.

FIG. 2 shows schematically a first example of a device for implementing the method according to the invention. In this example, use is made, for example, of a gas/liquid fluid or gas/liquid mixture fluid, wherein the gas may be carbon dioxide $CO_2$ under supercritical conditions Tc, Pc. The liquids are non-reactive liquids which have the particularity of separating the layers. The multilayer system SM, for example a photovoltaic module, to be treated, is introduced into a reactor 20 through a first inlet 21 provided with closure means 21c providing a seal and maintenance of pressurization. The reactor 20 also comprises a second inlet 22 connected to a first introduction conduit 23 provided with a first valve 24 for the introduction of carbon dioxide $CO_2$ for example. The reactor comprises a first outlet 25 connected to a first drain conduit 26 that is also provided with a second valve 27 for recovering $CO_2$ in a container 28 for example, at the end of the method. Temperature sensors CT and pressure sensors CP equip the reactor and the evacuation conduit to control the implementation of the method. A ceramic collar 30 in direct contact with the reactor 20 allows the heating of the reactor. Any device for heating the reactor could be used, for example an oven, heating resistors, etc.

Upstream of the reactor 20, the carbon dioxide or any other gas used during the process may be stored in a bottle (not shown), or else via a circuit comprising a $CO_2$ reservoir 31 that is connected to a cooling device 32 via a first conduit 33, and a high pressure pump 34, whose output is connected to a preheater 35, which itself is connected to the first valve 24.

The liquid mixture may be introduced directly into the reactor 20 with the multilayer system to be treated. One or more lines for introduction of the liquid or liquid mixture may equip the device for this purpose.

In FIG. 2, by way of example, a line is shown which allows the introduction of a liquid mixture into the reactor 20. The inlet line is connected to a second inlet 42 of the reactor 20. It comprises a second conduit 43 equipped with a third control valve 44, an optional preheater 45, positioned downstream of a pump 46, which receives the mixture of liquids stored in a reservoir 47. The evacuation of this mixture of liquids, is carried out via a drain circuit connected to a second outlet 48 of the reactor 20 connected to a drain conduit 49 equipped with a valve 50 and a reservoir or a drain pipe 51. Without departing from the scope of the invention, it would also be possible to equip the device with several liquid inlet lines, the mixing then taking place in the reactor 20. For example, to inject water and acetone, use may be made of two separate lines to introduce them into the reactor.

The photovoltaic modules PV are placed directly in the reactor 20 with the liquid mixture, for example. The reactor is then closed and the $CO_2$ is injected. The preheater 35 facilitates the rise in temperature of the $CO_2$ medium. The presence of the high pressure pump 34 coupled to the cryostat 33 makes it possible to reach higher pressures, thereby ensuring that the $CO_2$ is in the liquid state. Once the treatment parameters have been reached, i.e. the temperature Tr and the pressure Pr, an adjustment is made for a predetermined period. At the end of this stage, the system is cooled, then depressurization is carried out before opening the reactor. The various separated layers of the multilayer system without degradation and the mixture of liquids are then recovered. The layers or the subset of layers separated at the end of the method are subsequently rinsed with water and dried in air (ambient temperature, compressed air or natural air), for example, in order to eliminate liquid residues. It will also be possible to introduce the liquid mixture for continuous treatment through the liquid introduction circuits described above.

The gas used for the implementation of the method fills, for example, three functions, simultaneous or not:

It allows the increase and maintenance of the system pressure by adjusting the volume and temperature of the gas, It generates a swelling of the organic materials in order to facilitate the diffusion of the mixture of liquids in the multilayer compound, It allows the separation of either each layer individually or subsets of layers composing the multilayer system.

The mixture of non-reactive liquids will be chosen for its ability to separate either each layer unitarily or subsets of layers comprising the multilayer system, in addition to the action of the gas, regardless of the function performed by the latter according to the definition above, and without modification of the components of interest of the multilayer system. The volume proportion of the liquid mixture with respect to the gas will be at least 15%.

In the case of presence of glue ensuring bonding between the layers, the mixture of liquids will allow dissolution and/or extraction of glues without changing the components of interest.

The conditions of pressure Pr and temperature Tr for carrying out the treatment will, for example, be chosen from the following ranges; the temperature range [31° C., 150° C.]; the pressure range Pr [5 MPa, 50 MPa]. The value of the temperature Tr to which the reactor is raised will be chosen at a value lower than the degradation temperature Tg of the components constituting a layer of the multilayer system.

The mixture of liquids or fluid mixed with $CO_2$ will comprise, for example, ethanol, acetone, water, etc., i.e. any non-reactive fluid having the effect of separating either each layer unitarily or subsets of layers comprising the multilayer system in addition to the action of $CO_2$ at the interface of the layers constituting the multilayer system. The volume proportion of this mixture of liquids within the gas/liquid mixture fluid will be at least 15%.

The liquid mixture used for the treatment comprises, for example, acetone, and the value of the treatment temperature Tr is moderate, for example 90° C., between 30° C. and 150° C.

The method according to the invention may operate online, continuously or batchwise. In the case of an online operation, the steps or phases of setting the temperature and pressure, introduction and "emptying" of the recovered components, will be performed according to principles known to a person skilled in the art.

FIG. 3a gives an example of the structure of a photovoltaic module. The module comprises a first layer of external PVDF 501, a second layer of polyethylene terephthalate or PET 502, a third internal PVDF layer 503, an ethylene-vinyl acetate or higher EVA layer 504, the solar cell 505, a lower EVA layer 506 and a glass layer 507.

FIGS. 3b and 3c illustrate the mechanical separation of the layers of the backsheet in the case of application to a photovoltaic module, after treatment in a $CO_2$/acetone mixture. FIG. 3b shows the glass facing downwards, while FIG. 3c shows the glass facing upwards. The three layers of the backsheet are also shown for better understanding. The KPK backsheet is a three-layer film consisting of a layer of PVDF (Kynar® marketed by Arkema), a layer of PET and a layer of PVDF (Kynar®). During the mechanical separation of the multilayer system, one thus recovers on one side a 510 glass/EVA/solar cell/EVA/Kynar® assembly and, on the other 520, a PET/Kynar® assembly. The solar cell remains intact, encapsulated in the EVA forming a glass/EVA/solar cell/EVA unit, wherein the EVA may be separated from the glass. By chemical etching, it is then possible to recover the solar cell.

According to another embodiment, the fluid is a $CO_2$/water/acetone mixture. The temperature Tr is for example 90° C. FIGS. 4a and 4b show schematically the multilayer system after treatment. FIG. 4a corresponds to the glass facing downwards, while FIG. 4b corresponds to the glass facing upwards. It should be noted the separation of the fluorinated backsheet 602 from the rest of the photovoltaic module 601 glass/EVA/solar cell/EVA. The amount of liquid mixture in the $CO_2$/water/acetone fluid is, for example 15%, while the ratio of water to acetone may vary from 0 to 100%.

FIGS. 5a and 5b show the result obtained for a temperature Tr of 120° C. with the same $CO_2$/water/acetone mixture. It is then possible to mechanically separate all the layers of the module. The glass 701 is simply and cleanly separated from the remainder 702 of the multilayer system. The temperature Tr could be chosen, for example, to lie between 90° C. and 120° C. The next step consists, for example, in mechanically separating all the layers of the photovoltaic module. The treatment simultaneously leads to a separation of the layers composing the backsheet 702, and the assembly 703 composed of the encapsulant of the solar cell and the solar cell.

These last three explicit variant embodiments make it possible to completely dismantle a PV module using a $CO_2$/water/acetone mixture, without waste or degradation of the PVDF or Kynar® layers by optimizing the temperature between 90° C. and 120° C.

In the case of recycling non-fluorinated backsheet photovoltaic modules, the temperature Tr may be chosen equal to 60° C. The treatment will be carried out in the presence of $CO_2$ at 60° C. or in the presence of a $CO_2$/water mixture at 90° C. in order to separate the backsheet. The use of a mixture of $CO_2$/water/acetone at 120° C. will allow the separation of the backsheet and the recovery of the glass. Without departing from the scope of the invention, it is possible to work at lower temperatures, in the order of 60° C., 90° C., for example, especially for the $CO_2$/water/acetone mixture.

In general, the operating parameters of the method according to the invention will be as follows:
  A temperature Tr between a minimum temperature $T_{min}$ chosen to exceed the critical temperature of the gas used, for example 31° C. for $CO_2$, and a maximum temperature $T_{max}$ chosen to maintain the system components, i.e. not to degrade them, i.e. 150° C. for c-Si PV systems with fluorinated backsheet, for example,
  A pressure Pr, fixed beyond the critical pressure of the gas, for example $CO_2$,
  A temperature dwell time that is a function of the nature and size of the waste, and also the equipment, wherein the dwell time may be zero, while the rise/fall time at the chosen temperature are selected to ensure the separation,
  A volume composition of gas/liquid mixture(s), the volume proportion of the mixture of liquids relative to the gas will be at least 15%, with, for example, water and acetone for mixing liquids. The volume proportions of the constituents of the mixture of the liquids/acetone-water mixture, for example with proportions by volume of 80% of acetone and 20% of water, or with a proportion of water ranging from 0 to 100% relative to the acetone.

The method described above may be implemented in the recycling of many multilayer systems. The multilayer system may be, for example, a cosmetic packaging waste composed of a polymer layer coated with one or more metals. It is also possible to treat pharmaceutical packaging waste consisting of a plastic layer and an aluminum film, the treatment allowing a clear separation of the layers.

The method is also used to recycle waste, for example:
  Chewing gum packaging comprising an assembly of organic layers and an aluminum layer, in order to separately obtain aluminum and organic layers without the need for mechanical action, Packaging of a compote pot without prior knowledge of the nature of the layers, leading to the separation of the various layers, organic layer, aluminum layer and other organic layer, Fresh cream package consisting of PE/cardboard/PE/aluminum/PE/PE, etc., The method may also be used to separate the layers present in c-SI PV cells, OLEDs (organic light emitting diodes), display devices, etc.

For the treatment of this waste, this waste is, for example, precut before subjecting it to the two treatments described above:

Supercritical $CO_2$ treatment at 90° C. and 15 MPa,
Treatment in a $CO_2$/water/acetone mixture at 105° C. and 18 MPa.

The pre-cutting step makes it possible, in particular, to promote and/or allow access of the gas/liquid mixture fluid to the interfaces of the different layers of the system and thus the separation of the layers. This results among other things in a reduction in processing times. It also makes it easier to handle multilayer systems.

For the treatment of cosmetic packaging waste, consisting of a plastic film coated with a metal deposit, it is possible to recover in solution the metals present on the cosmetic packaging waste.

In the case of pharmaceutical packaging treatment, the method makes it possible to recover the aluminum.

The treatment of compote packaging will lead to the separation of organic layers from aluminum.

In order to minimize the energy costs related to the method, and to avoid thermal decomposition of certain components of the layers, the operating temperature will be at most equal to 150° C., below the degradation temperature Tg of the compounds. In this way, it is possible to treat multilayer systems comprising at least one organic layer that could generate toxic or environmentally hazardous compounds, such as fluoropolymer of the PVF or PVDF type. This temperature value does not limit the use of the method to higher temperatures if the separation of the layers of the system requires it.

The method according to the invention advantageously makes it possible to recover the various components of a multilayer system without harming the environment, or at least minimizing the impact on the environment. It finds its use in many fields, including household waste, electronic waste, The method according to the invention makes it possible, in particular, to easily recover glass while retaining both its optical and chemical surface properties.

The invention claimed is:

1. A method of delamination/dismantling multilayer systems SM comprising several layers including at least one organic layer, wherein the layers are separated by interfaces, wherein said method comprises:
   mixing the multilayer system with a fluid comprising at least one gas that causes the swelling of at least one of the layers and one or more liquids that do not react with the surface of the layers and that separate each layer unitarily or subsets of layers comprising the multilayer system without degradation of the constituents of the layers, the gas/liquid fluid being raised in temperature and pressure, and
   recovering separately at least one or more layers or a subset of undegraded layers,
   wherein a treatment is performed in which the value of a treatment temperature Tr is greater than the critical temperature Tc of the gas and lower than the degradation temperature Tg of the layers of the multilayer system, and wherein a treatment pressure value Pr is higher than the critical pressure Pc of the gas and the volume proportion of a mixture of liquids with respect to the gas is at least 15%.

2. The method according to claim 1, wherein said method is operated with a temperature between 30° C. and 150° C. and a pressure between 5 MPa and 50 MPa.

3. The method according to claim 1, wherein the fluid is a mixture of $CO_2$/water/acetone with a proportion of water relative to acetone ranging from 0 to 100%.

4. The method according to claim 3, wherein the temperature lies between 60° C. and 130° C.

5. The method according to claim 1, wherein the multilayer system is a photovoltaic module comprising a fluorinated layer, a packaging, a food, cosmetic or pharmaceutical packaging, or an organic electronic component.

6. The method according to claim 1, further comprising precutting of the multilayer systems and rinsing and drying the layers or subsets of separate layers.

7. A device for delamination/dismantling multilayer systems comprising several layers including at least one organic layer, the layers being separated by interfaces, wherein it comprises at least the following elements in combination:
   a reactor comprising:
      a first inlet for the introduction of at least the multilayer system SM, a second inlet for the introduction of a fluid comprising at least one gas causing separation of the layers, and at least one inlet for a liquid or a mixture of liquids that do not react with the surface of the layers,
      a first outlet for recovering the gas at the end of the method,
      wherein a treatment is performed in which the value of a treatment temperature Tr is greater than the critical temperature Tc of the gas and lower than the degradation temperature Tg of the layers of the multilayer system, and wherein a treatment pressure value Pr is higher than the critical pressure Pc of the gas and the volume proportion of a mixture of liquids with respect to the gas is at least 15%, and
   a temperature setting device of the reactor, to raise the temperature of the gas/liquid mixture,
      wherein said device comprises a gas reservoir connected to a cooling device via a first conduit, a high pressure pump whose output is connected to a preheater, said preheater being connected to a first valve equipping a gas introduction conduit connected to the first inlet, a gas evacuation conduit towards an enclosure.

8. A device for delamination/dismantling multilayer systems comprising several layers including at least one organic layer, the layers being separated by interfaces, wherein it comprises at least the following elements in combination:
   a reactor comprising:
      a first inlet for the introduction of at least the multilayer system SM, a second inlet for the introduction of a fluid comprising at least one gas causing separation of the layers, and at least one inlet for a liquid or a mixture of liquids that do not react with the surface of the layers,
      a first outlet for recovering the gas at the end of the method,
      wherein a treatment is performed in which the value of a treatment temperature Tr is greater than the critical temperature Tc of the gas and lower than the degradation temperature Tg of the layers of the multilayer system, and wherein a treatment pressure value Pr is higher than the critical pressure Pc of the gas and the volume proportion of a mixture of liquids with respect to the gas is at least 15%, and a temperature setting device of the reactor, to raise the temperature of the gas/liquid mixture, wherein said device comprises one or more lines for introducing liquids connected to a second inlet of the reactor, a line comprising at least a second conduit equipped with a third control valve, a pump which receives the liquid or the mixture of liquids that do not react with the surface of the layers stored in a reservoir, a drain circuit connected to a second outlet of the reactor that is connected to a conduit equipped with a valve and a reservoir or drain pipe.

* * * * *